United States Patent
Cummins et al.

[11] Patent Number: 5,959,201
[45] Date of Patent: Sep. 28, 1999

[54] HAND-HELD TIRE PRESSURE AND SOUNDNESS TESTING DEVICE

[76] Inventors: Joseph A. Cummins, 10655 Hazelhurst Dr., Houston, Tex. 77043; Don Velzy, Star Rte. Box 60, Williamsburg, N.Mex. 87942

[21] Appl. No.: 08/965,287
[22] Filed: Nov. 6, 1997
[51] Int. Cl.[6] .................................................. G01L 17/00
[52] U.S. Cl. ........................................... 73/146.2; 73/146
[58] Field of Search ..................... 73/146, 146.2

[56] References Cited

U.S. PATENT DOCUMENTS

| | | | |
|---|---|---|---|
| D. 348,771 | 7/1994 | Barnes | D3/209 |
| 2,601,554 | 6/1952 | Peters | 240/6.42 |
| 3,069,804 | 12/1962 | Cirafesi | 46/1 |
| 3,113,482 | 12/1963 | Hirsch | 84/477 |
| 3,120,147 | 2/1964 | Fletcher | 84/477 |
| 3,543,715 | 12/1970 | Hill | 116/67 |
| 3,662,080 | 5/1972 | Hale et al. | 84/477 B |
| 5,583,288 | 12/1996 | Brenner et al. | 73/132 |

*Primary Examiner*—Joseph L. Felber

[57] ABSTRACT

A hand-held tire pressure and tire soundness testing device is described. A shaft having a linear axis of symmetry, a predetermined maximum shaft cross-sectional dimension, a distal end and a proximal end is provided. A tire-striking head extends from the distal end of the shaft. The tire-striking head has a circular cross-sectional shape perpendicular to the axis of symmetry of the shaft and has an axially symmetrical striking surface defined by rotating an imaginary convex curve around the axis of symmetry at a predetermined maximum head diameter greater than the predetermined maximum shaft diameter. A handle coaxially extends from the proximal end of the shaft. The handle has a circular cross-sectional shape at a plane perpendicular to the axis of symmetry and has a maximum handle diameter equal to or greater than the cross-sectional dimension of the shaft.

2 Claims, 6 Drawing Sheets

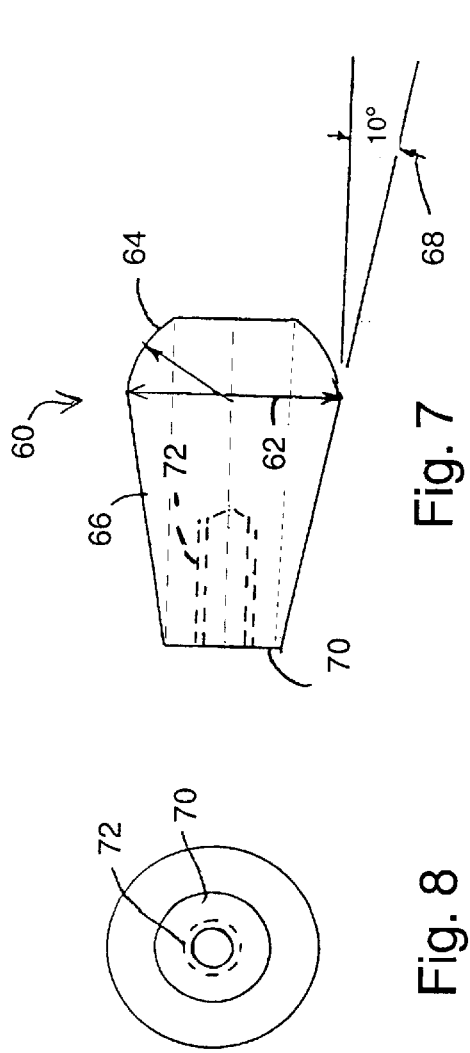
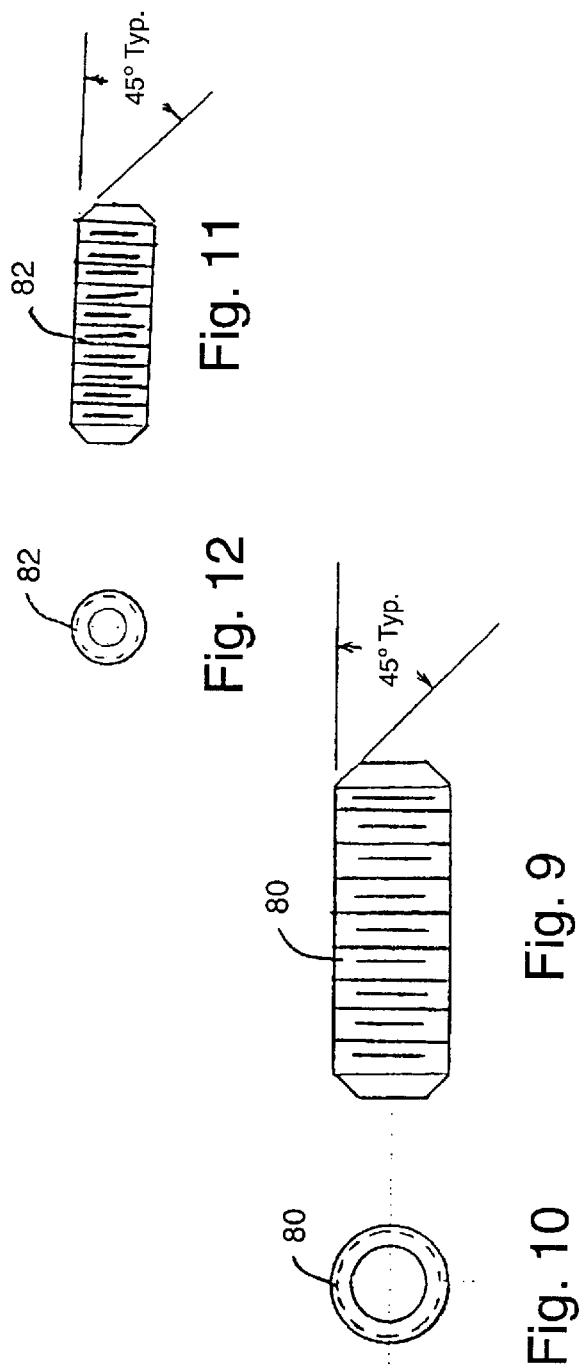

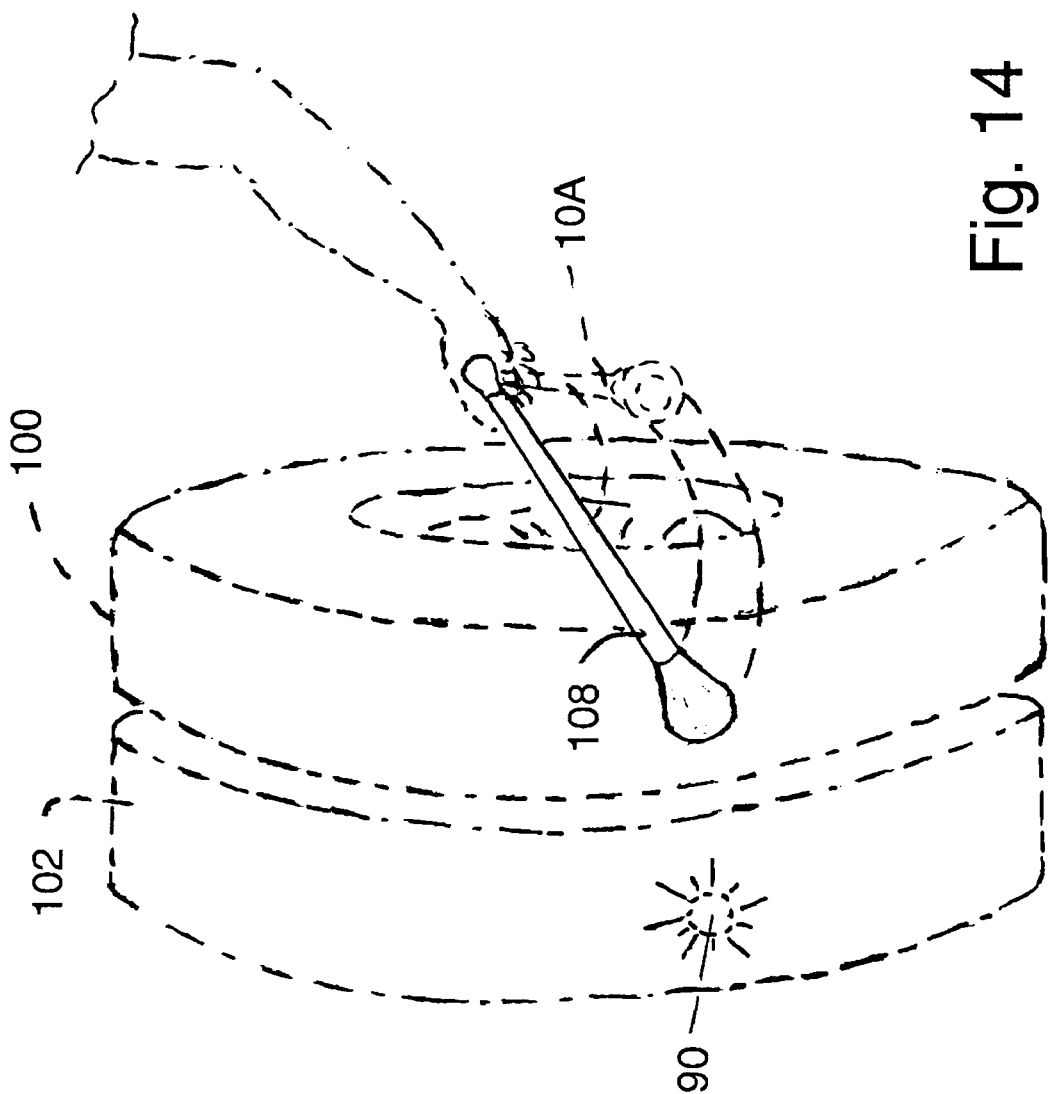

HAND-HELD TIRE PRESSURE AND SOUNDNESS TESTING DEVICE

TECHNICAL FIELD OF THE INVENTION

The present invention relates to a hand-held tire pressure and soundness testing device, and particularly to the elongated hand-held tool having a hand holding end and a tire striking end by which the state of inflation and soundness of a pneumatic tire may be tested.

BACKGROUND OF THE INVENTION

In the transportation industry and particularly in the trucking industry, properly inflated pneumatic tires are essential. In the trucking industry, eighteen wheelers are the standard of the industry with two tires on each side of each axle. The tires must support significant loads and duel tires provide redundancy so that failure of a single tire on either side of an axle does not totally disable the vehicle. It is important to test the state of inflation of truck tires at periodic intervals. Current U.S. regulations by the Department of Transportation (DOT) require inflation inspection of all tires on a truck every three hours of operation when carrying standard cargo and every two hours when carrying hazardous materials.

It has been found that the major cause of truck tire failures and blowouts, is due to damage caused by heat buildup from running the tire when it is under-inflated. Thus, it is extremely important to periodically check the inflation of truck tires. At fueling stations and truck repair facilities or fleet service yards, air pressure testing can be conducted by applying an air gauge to the valve of each tire. Tire pressure testing using air pressure gauges is less convenient along the road at poorly lighted areas. This procedure, if properly conducted with accurate air pressure gauges can produce reliable results; but such testing with air pressure gauges is time-consuming. In the case of eighteen wheelers, the use of air pressure gauges to test all the tires can take at least four to six minutes for an eighteen wheeler without valve stem covers and eight to thirteen minutes if there are valve stem covers. For triple trailers or nonstandard trailers where the number of wheels is greater, sometimes up to 26 wheels or more, the time required for air pressure gauge testing increases to as much as twenty minutes or more. During a typical trip with a team of two drivers requiring thirty hours of travel time, for example, from Houston to Los Angeles, compliance with DOT regulations requires ten stops (fifteen stops for hazardous material transport). The loss of travel time for such a trip may be anywhere between forty minutes and more than three hours for each trip carrying standard freight, and between one hour and five hours for each trip carrying hazardous freight ("HAZMAT").

As an alternative to air pressure gauge testing for determining proper inflation of truck tires, kicking the tires or striking the tires with sticks, pipes, bars, and hammers is sometimes attempted. The concept for such prior devices was that the impact action against the tire produced a noise or feel that could be vaguely indicative of tire inflation. Properly inflated truck tires are typically inflated to about 100 PSI. Some operators consider inflation over 60 PSI to be acceptable and anything less than 60 PSI to be "flat". It has been found that significant damage and expenses can result when tires are run at less than about 80 PSI. Previous striking sticks, pipes, bars, and hammers cannot adequately distinguish between tires inflated at 100 PSI and those at 60 PSI. Such devices produced inadequate and inconsistent results for a variety of reasons. Even if a striking device has sufficient weight, the results are still inadequate because of inconsistencies of the striking impact "footprint". In the case of a standard hammer the "footprint" or impact area may be too large when the face of the hammer hits the tire tread or too small when the edge of the face hits the tire. A ball-peen hammer requires that the angle or position of the hammer head be identical for every blow; it is difficult at best to maintain a consistent angle with respect to all the tires whether inside, outside, left, right, forward, and back tires. All must be tested. In the case of pipes, sticks and bars, the results of striking the tire can be completely different depending upon the angle of impact whether the impact is at the corner at the end of the cylindrical-shaped tool or on the side of the shaft.

Time constraints, delivery schedules, and tiredness encourage the professional truck driver to complete the required testing as quickly as possible; yet, inadequate tools previously existed for rapid and accurate tire testing. Still, under-inflation is a primary reason for tire failure and blowouts. This results in potentially hazardous conditions ranging from potential loss of control of the truck, to producing road hazards for other motorists, and to damaging electrical lines, hydraulic hoses, mud flaps, and other vulnerable parts of the truck trailer. This also results in added costs. Combination downtime at the side of the road or even at a service facility and the time and effort for replacement of the tire and the expense of the tire replacement are all costs that result from tire failure. It has been found that truck drivers and trucking companies with well-maintained trucks may still experience an average of one blowout a week as a result of excessive wear due to heat from under-inflated tires.

SUMMARY OF THE INVENTION

The present inventive hand tool provides an elongated shaft, a striking head with adequate weight and a handle construction which quickly, accurately and consistently provide the operator with information regarding truck tire inflation. The tool is designed to provide adequate weight concentrated at the striking end, for impacting high pressure truck tires. The tool is designed for convenient, secure and consistent striking against truck tires by an operator. A consistent impact "footprint" is produced and the sound and feel are truly representative of the air pressure in the tire. The tool is designed with a symmetrical, solid curved striking surface which consistently impacts against truck tires to provide uniform results for all truck tires at all locations on the truck whether an inside, outside, left, right, forward, or rear tire is to be tested. The unique shape automatically causes the user to strike the tire at a proper impact angle.

According to another aspect of the invention, the tool striking head is connected to the shaft with an expanding taper to both increase concentration of weight at the striking head and also to provide smooth, contoured exterior surface for convenient storage and removal from storage, for example removal from a duffle bag or other luggage without binding against clothing or other articles within the luggage or duffle bag.

According to one aspect of the invention, the tool is uniformly formed of a single piece of strong metal. Preferably brass is used for machinability and to avoid corrosion.

According to another aspect of the invention, a hand-held tire pressure and tire sounding testing tool is constructed of three separately formed solid metal pieces rigidly and coaxially connected to each other. This construction advantageously avoids material waste and allows economical machining of the parts. The three-piece construction also has an advantage of not requiring substantial up-front costs for molds or tooling associated with casting or forging manufacturing procedures. Preferably, the head and the handle are brass. The shaft may be brass for added weight or aluminum for reduced weight.

According to one embodiment, the tool has at least a striking surface defined by rotating an imaginary arc of a circle about the axis of symmetry at one end of a shaft. Such a surface can be produced using a segment of a sphere. The solid symmetrically-curved striking surface has a maximum diameter greater than the shaft diameter and is connected to the shaft with a truncated conical surface.

According to another embodiment of the invention, the striking head is substantially spherical, having a diameter greater than the maximum dimension of the shaft to which the head is attached. A smaller, substantially spherical handle is attached to the other end of the shaft. The handle is slightly larger than the minimum shaft diameter. Elimination of the tapered neck connection between the striking surface and the shaft by attaching the shaft directly to the spherical striking head, reduces material cost and significantly reduces costs of manufacture.

BRIEF DESCRIPTION OF THE DRAWINGS

The foregoing objects, advantages, and features, as well as other objects and advantages, will become more apparent with reference to the description and drawings below, in which like numerals represent like elements and in which:

FIG. 7 is a side elevation view of the handle of the hand tool of FIGS. 1 and 2;

FIG. 8 is an end view of the handle of FIG. 7;

FIG. 9 is a side elevation view of the connector of the distal end connector of FIG. 2;

FIG. 10 is an end view of the connector of FIG. 9;

FIG. 11 is a side elevation view of the proximal end connector of FIG. 2;

FIG. 12 is an end view of the connector of FIG. 11;

FIG. 14 is a perspective view of the hand-held tire pressure and tire soundness tool in use on a truck tire.

DETAILED DESCRIPTION OF THE PREFERRED EMBODIMENTS

Figure 1:
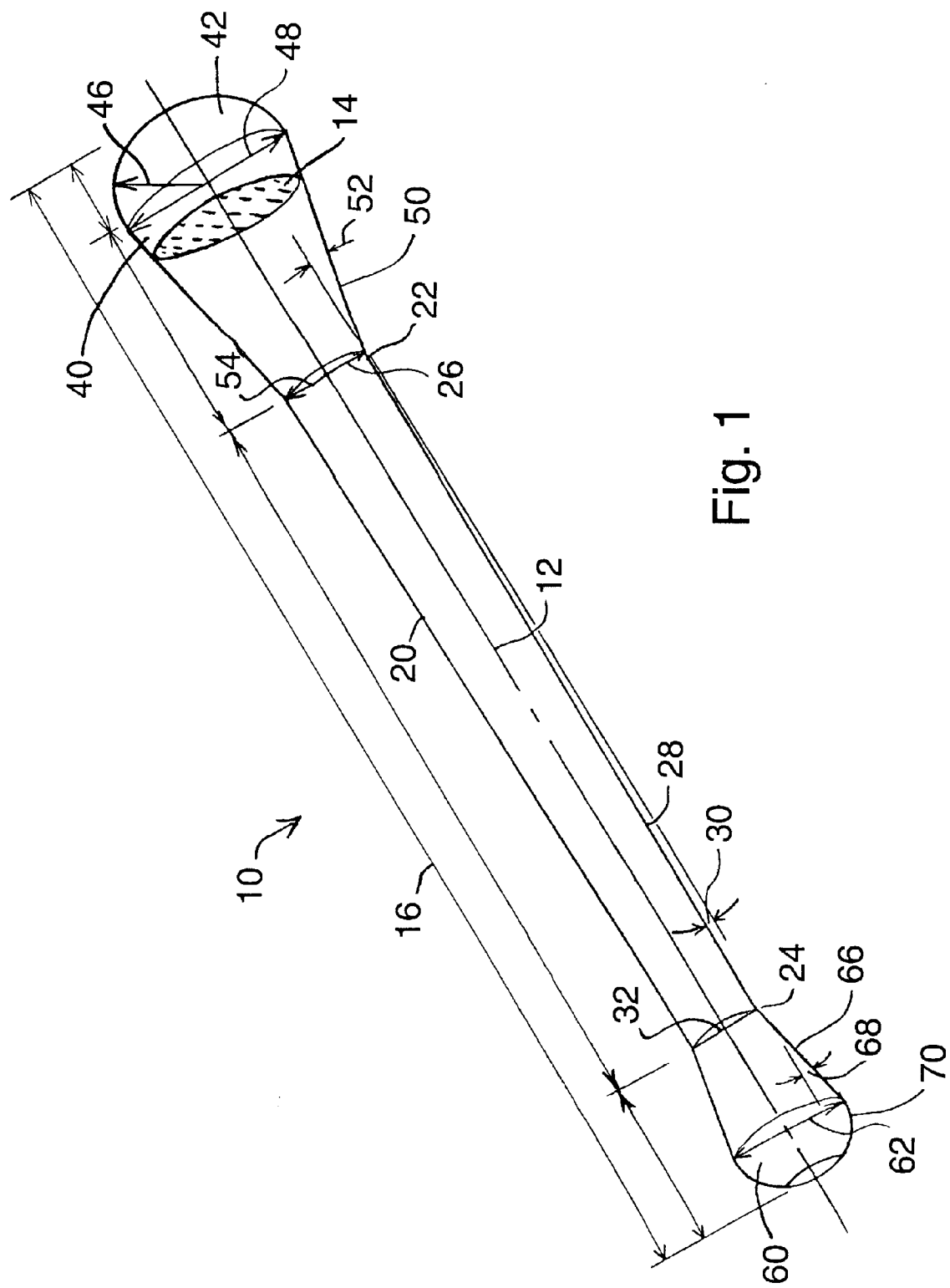
FIG. 1 is a perspective view of one embodiment of a hand-held tire pressure and soundness testing device according to the present invention.

FIG. 1 is a perspective view of one embodiment of a hand-held tire pressure and tire soundness testing device according to the present invention. The hand-held tool depicted in FIG. 1 is integrally formed of a solid piece of metal. The surfaces are all formed symmetrically about an axis of symmetry 12. In the embodiment depicted, the tool has a striking head with a substantially circular cross-section at any imaginary perpendicular plane 14 drawn through the striking head 40 of tool 10. The tool 10 may be formed by machining a solid piece of metal bar stock, such as aluminum, brass, or steel. Preferably and advantageously, the tool is formed from steel or brass to provide adequate weight between about 2½ to 5 pounds. The tool is advantageously formed of brass to maintain adequate weight while minimizing corrosion or rusting and to facilitate machining processes. Solid aluminum construction is also less subject to corrosion than steel, but the weight is also less and not as desirable as brass.

Handtool 10 comprises a shaft 20 extending a predetermined distance from a distal end 22 to a proximal end 24. Shaft 20 is formed coaxial with and symmetrically around an axis of symmetry 12. Shaft 20 has a predetermined maximum cross-sectional dimension 26 which occurs at distal end 22. Also, according to the embodiment depicted in FIG. 1, shaft 20 is provided with a slightly tapered surface 28. A slight taper angle 30 of between about ½° and 2° and preferably about 1°, relative to the axis of symmetry, extends on all sides along the length of the shaft from at or near the proximal end minimum shaft dimension 32 to at or near the distal end maximum shaft dimension 26. The taper concentrates mass towards the striking head. While the shaft 20 need not have a circular cross-section to function, advantages are obtained from the complete symmetry of a cylindrical shaft or a slightly tapered shaft having a circular cross-section.

A striking head 40 is connected to the distal end 22 of shaft 20. Head 40 presents a striking surface 42 uniformly symmetrical about the axis of symmetry so that it has a substantially circular cross-section at a plane perpendicular to the axis of symmetry. Preferably, striking surface 42 defines a solid curved surface, such as a curved surface 44 as shown, which is defined by rotating an arc of a circle, having a radius 46, about the axis of symmetry 12. Preferably, the maximum cross-sectional diameter 48 of the striking head surface 42 occurs at a plane through the center of the radius of curvature 46 and perpendicular to the axis of symmetry 12. A tapered neck surface 50 interconnects between distal end 22 of shaft 20 and striking surface 42 at the maximum diameter 48 of striking head 40. The taper angle for the connecting neck surface 50 is between about 5° and 15° and preferable about 10° measured relative to that axis of symmetry 12. The minimum neck diameter 54 advantageously corresponds to the predetermined maximum cross-sectional dimension 26 of shaft 20 so that a smooth corner-to-corner transition is made along the handheld tool.

A handle 60 extends from the proximal end 24 of shaft 20. The handle has a maximum handle diameter 62 larger than the minimum shaft diameter 32 at the proximal end 24 of the shaft 20. Maximum handle diameter 62 is substantially smaller than the maximum diameter 48 of striking head 40. Handle 60, in the embodiment depicted in FIG. 1, has a solid rounded end portion 64 and a tapered coupling surface 66. The coupling surface 66 is preferably a truncated conical surface at an angle 68 measuring approximately the same as the angle of the tapered neck surface 50 in the opposite direction. The taper angle is between about 5° and 15° and preferably about 10° with respect to the axis of symmetry 12 and expands outward from the proximal end dimension 32 of shaft 40 to the maximum handle diameter 62.

In the preferred embodiment, the overall length 16 of tool 10 is between about 10 inches and 18 inches long. A particularly desirable length is about 14½ inches to advantageously swing against a truck tire at a convenient height and angle. A tool of this desirable length advantageously results where the length of the shaft is about 9 inches, the length of the striking head is about 3½ inches, and the length of the handle is about 2 inches. Preferably, the predetermined maximum cross-sectional dimension 26 of the shaft is between about ¾ of an inch and 1¼th inches. The maximum diameter 48 of the striking head 40 is preferably between about 1½ inches and 3 inches. The maximum handle diameter is between about 1⅛ inches and about 1⅝ inches.

Within these ranges of dimension, one particularly preferred embodiment has a shaft that is 8½ inches long, a maximum shaft diameter of 1 inch, and a minimum shaft diameter of ¾ of an inch, thereby defining a taper on the shaft surface 28 of approximately 1° on all surfaces. In the particularly preferred embodiment the striking head has a maximum diameter of 2 inches, and the curved striking surface 42 has a radius of curvature of one inch. The overall length of the striking head 40 is about 3¾ inches, including a truncated conical neck coupling surface 50 extending from the maximum shaft diameter of one inch to the maximum striking head diameter of 2 inches and extending an axial a distance of approximately 2¾ inches. The angle 52 of the truncated conical neck 50 is of about 10° relative to the axis of symmetry 12. The handle 60 in the particularly preferred embodiment has a total length of about 2¼ inches and a maximum handle diameter of about 1⅜ inches. The radius of curvature of the rounded handle end 64 is about ¹¹⁄₁₆ths of an inch and a truncated conical taper extends from a minimum shaft diameter of ¾ths of an inch to the maximum handle diameter of 1⅜ inches. The taper angle is approximately 10° relative to the axis of symmetry and extends about 1⅝ inches long.

Figure 2:
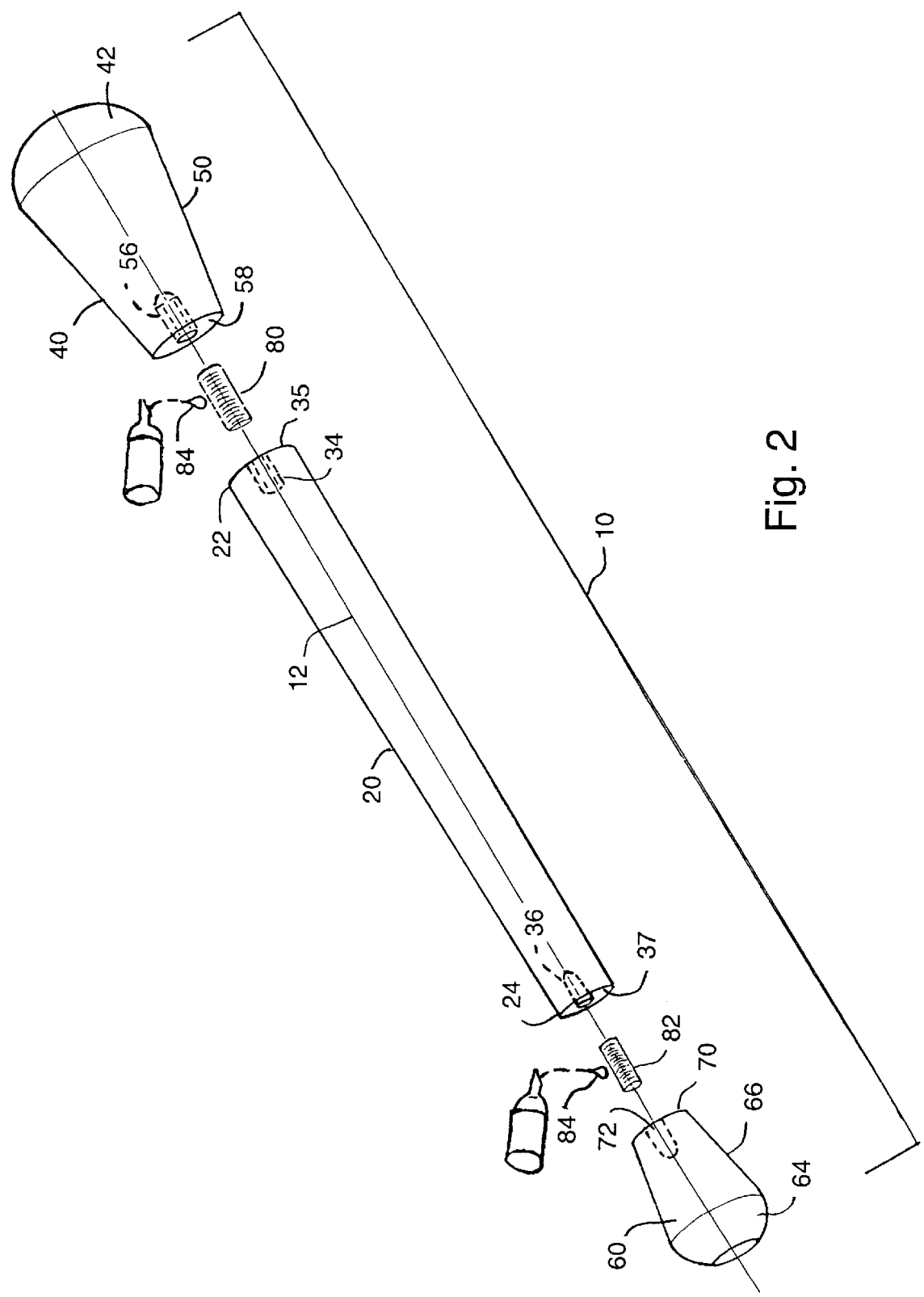
FIG. 2 is a perspective assembly view of another embodiment of a hand-held tire pressure and soundness testing device according to the present invention.

FIG. 2 depicts a perspective assembly view of an alternative embodiment of the invention in which the head 40, the shaft 20, and the handle 60 are all separately formed and subsequently coaxially interconnected one with the other to form a substantially solid hand-held tire pressure and tire soundness testing device 10. In the embodiment depicted in FIG. 2, the distal end 22 of shaft 20 is formed with an abutment surface 35 having coaxial internal connecting threads 34 formed therein. Head 40 is formed with a corresponding connector surface 58 and coaxial internal connector threads 56. A first threaded connector 80 is inserted between the striking head 40 and the shaft 20. Shaft 20 is also formed with a proximal abutment surface 37 with coaxial internal threads 36 therein. The coaxial threads in all pieces are formed along the axis of symmetry 12. Handle 60 is likewise formed with a connector surface 70 and coaxial internal connector threads 72. A second threaded connector 82 is engaged between shaft proximal threads 36 and handle threads 72. In the preferred embodiment, metal to metal thread bonding agent or glue 84 is applied to the engagement threads at first connector 80 and also at second connector 82. An anaerobic glue manufactured by Loctite, #271 (Red) or other anaerobic glues for this purpose may be used.

FIGS. 3, 4, 5, 6, 7, 8, 9, 10, 11, and 12 show side elevation views and end views of various component parts of the embodiment of the invention having separately formed head, shaft and handle pieces which are connected together with threaded studs 80 and 82.

Figure 3:
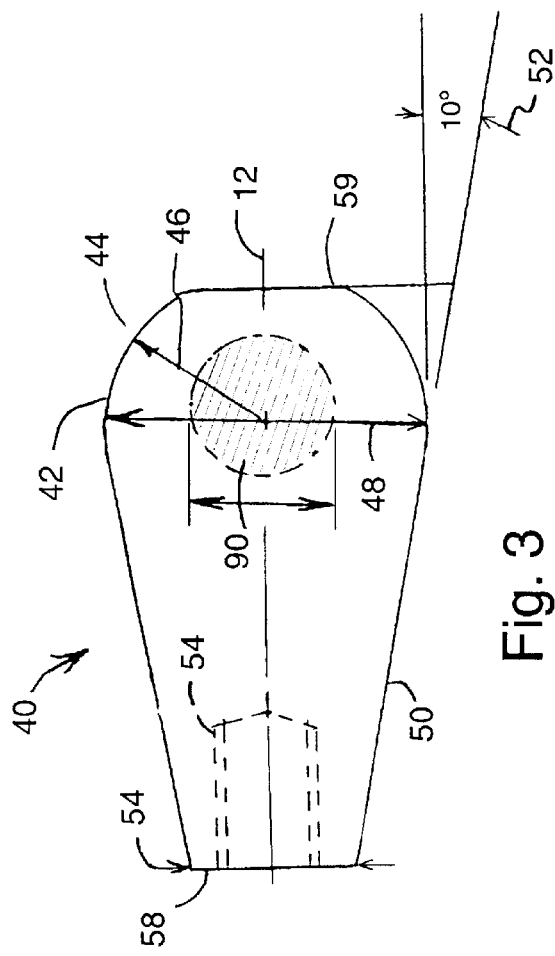
FIG. 3 is a side elevation view of the striking head of the embodiment of the hand-held tool of FIG. 2.

FIG. 3 shows a side elevation view of the striking head 40 of the hand-held tool of FIG. 2. A flat distal end 59 truncates an otherwise hemispherical striking surface 44. The flat distal end 59 causes increased concentration of mass at the center of the maximum diameter 46. Also shown is a schematic depiction of a uniform "footprint" 90 that results against the tire tread upon striking it. The footprint 90 is preferably substantially symmetrical and preferably a circular area with a diameter of between about ¾ inch to 1½ inch.

Figure 4:
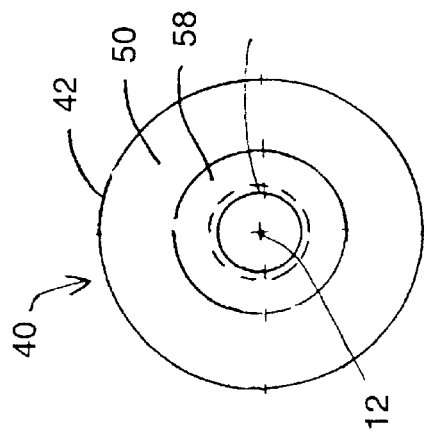
FIG. 4 is an end view of the striking head of FIG. 3.

FIG. 4 is an end view of the striking head of FIG. 3.

Figure 5:
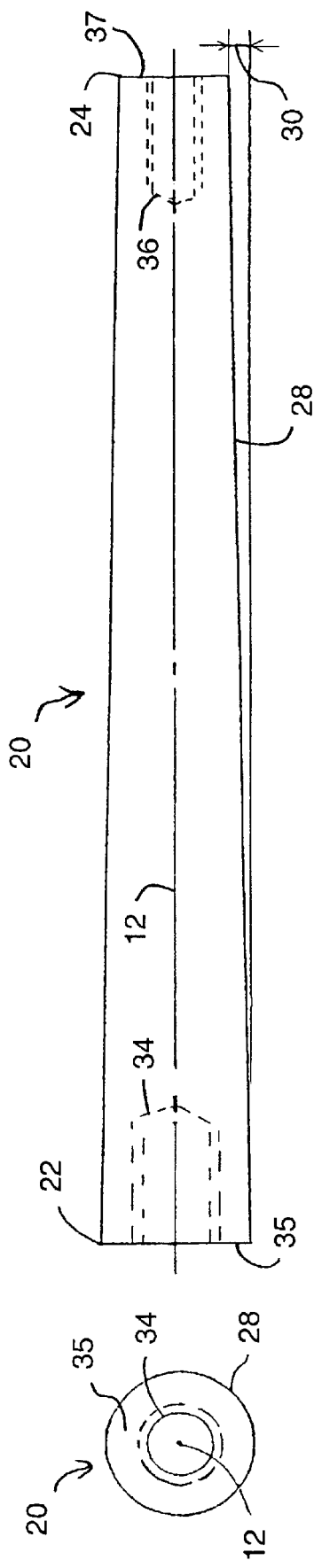
FIG. 5 is a side elevation view of the shaft of the hand tool of FIGS. 1 and 2.

FIG. 5 is a side elevation view of the shaft of the hand tool of FIGS. 1 and 2.

Figure 6:
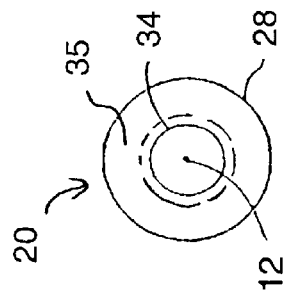
FIG. 6 is a end view of the shaft of FIG. 5.

FIG. 6 is a end view of the shaft of FIG. 5.

FIG. 7 is a side elevation view of the handle of the hand tool of FIGS. 1 and 2.

FIG. 8 is an end view of the handle of FIG. 7.

FIG. 9 is a side elevation view of the connector of the distal end connector of FIG. 2.

FIG. 10 is an end view of the connector of FIG. 9.

FIG. 11 is a side elevation view of the proximal end connector of FIG. 2.

FIG. 12 is an end view of the connector of FIG. 11.

Figure 13:
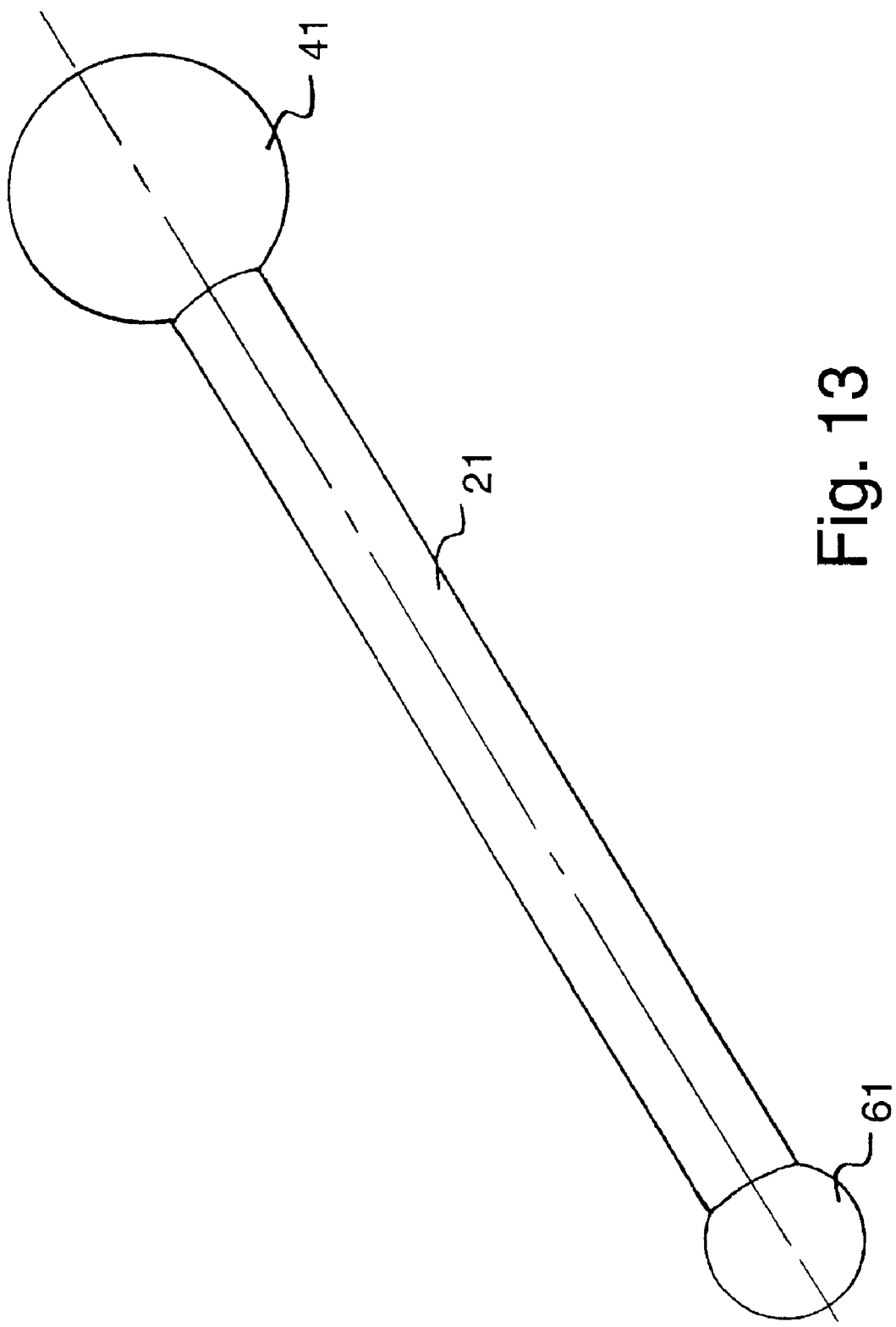
FIG. 13 is a perspective view of an alternative embodiment including some of the aspects of the invention.

FIG. 13 shows an alternative embodiment of a hand-held tire pressure testing and soundness testing tool in which a shaft 21 is a solid cylinder with or without a slight taper. A striking head 41 is substantially spherical having a connector surface and coaxial connector threads for rigid connection to the shaft 21. A handle 61 is similarly substantially spherical, and has a connector surface for connection to the proximal end of the shaft 21. This embodiment has many features of the invention including a constant radius striking surface. It also provides a significant amount of weight localized at the distal end, that is at the striking head. It provides a convenient rotatable handle. The tool is symmetrical about a single axis. This embodiment sacrifices a portion of the weight found in the tapered neck of striking head 40 and the concentration of the weight at the striking head which results from moving such a tapered neck. Elimination of the slight taper of the shaft as well as elimination of the tapered neck coupling between the shaft and the striking head also reduces the ease of withdrawing the tool from luggage or duffle bags. Nevertheless, the alternative embodiment depicted in FIG. 12 has an advantage in lower costs of manufacturing because the amount of material is reduced and the time otherwise required to form the shaft taper and the steep neck tapers at the striking head and at the handle are eliminated. The spherical ends 41 and 61 are conveniently formed in a standardized machining operation thereby reducing the cost. Also the use of a straight solid cylindrical shaft 21 instead of a tapered shaft 20 further reduces the machining expense.

FIG. 14 is a schematic perspective view depicting a hand-held tire pressure and tire soundness testing tool in use on a truck tire 100 (shown in phantom lines). The tool is swung downward from Position 10A (shown in phantom) to an impact Position 10B. An imaginary "footprint" 90 is schematically shown on an adjacent previously tested tire 102. It is the sound and feel upon impact that indicates whether the tire is properly inflated and sound.

Thus, what has been disclosed is a hand-held tire pressure and tire soundness testing device comprising a coaxially aligned shaft and striking head. The striking head uniquely has an axially symmetrical curved striking surface and produces a concentration of weight at the point of striking. The symmetrical striking surface results in a consistent instantaneous indentation or "footprint" upon striking the tire. The consistent impact provides uniform results, producing both sound and vibration or "feel" by which the user may distinguish between and thereby detect a proper inflation or under-inflation as the case may be. Tire soundness, potential tire failure, or tread separation, as the case may be, can also be determined in appropriate cases.

Other alterations and modifications of the invention will likewise become apparent to those of ordinary skill in the art upon reading the present disclosure, and it is intended that the scope of the invention disclosed herein be limited only by the broadest interpretation of the appended claims to which their inventors are legally entitled.

What we claim is:

1. A hand-held tire pressure and tire soundness testing device comprising:

(a) a shaft having a linear axis of symmetry, a predetermined maximum shaft cross-sectional dimension, a distal end and a proximal end, wherein said shaft comprises a solid frustum-shaped shaft having a taper angle of between about ½° and 2°, and wherein said maximum shaft dimension comprises a maximum shaft diameter at said distal end of said shaft and having a predefined minimum diameter at said proximal end;

(b) a tire-striking head attached to said distal end of said shaft, said tire-striking head having a circular cross-sectional shape perpendicular to said axis of symmetry of said shaft and having an axially symmetrical striking surface defined by rotating an imaginary convex curve around said axis of symmetry at a predetermined maximum head diameter greater than said predetermined maximum shaft dimension, wherein said striking surface comprises an arc of a circle having a predefined radius and having its center at a point on said axis of symmetry of said shaft;

(c) a handle coaxially attached to said proximal end of said shaft, said handle defining a circular cross-sectional shape at a plane perpendicular to said axis of symmetry and having a diameter equal to or greater than said maximum cross-sectional dimension of said shaft; and (d) a tapered coaxially symmetrical surface coupling between said distal end of said shaft and said striking surface of said tire-striking head.

2. A tire inflating testing tool comprising:

(a) A solid metal shaft having an axis of symmetry and two ends;

(b) A solid metal striking head attached to one of said two ends of said shaft and having a truncated hemisphere-shaped striking surface symmetrical with said axis of symmetry, the diameter of said striking surface larger than the diameter of said solid metal shaft; and (c) A solid metal rounded handle attached to another of said two ends of said shaft, the diameter of said handle being larger than the diameter of said shaft.

* * * * *